(No Model.)
J. C. TALIAFERRO.
DIE FOR WELDING LINKS.
No. 453,220. Patented June 2, 1891.
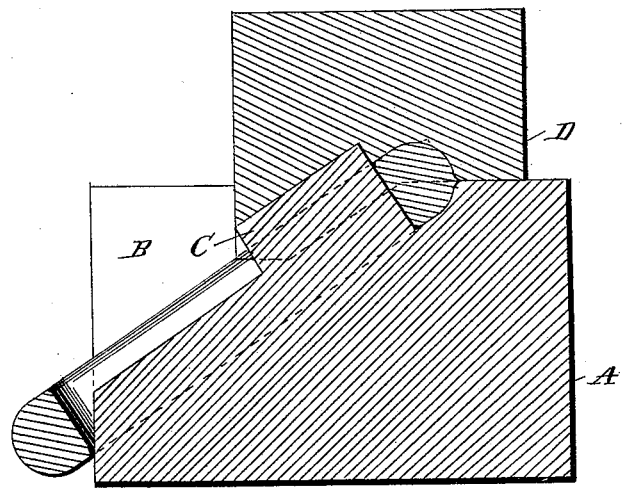
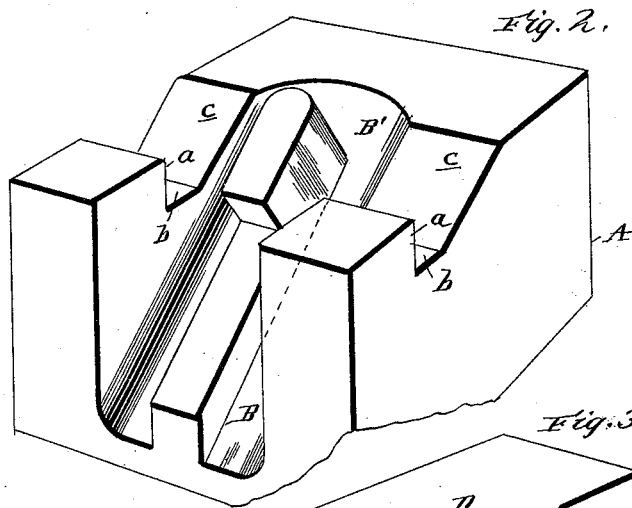
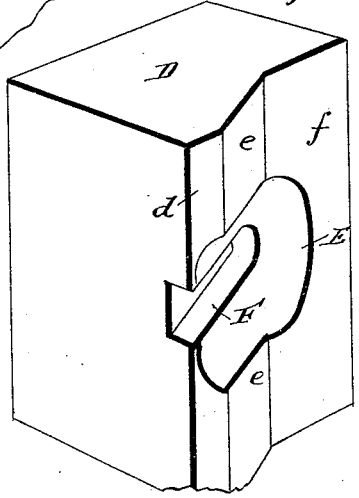

UNITED STATES PATENT OFFICE.

JOHN C. TALIAFERRO, OF RICHMOND, VIRGINIA.

DIE FOR WELDING LINKS.

SPECIFICATION forming part of Letters Patent No. 453,220, dated June 2, 1891.

Application filed December 24, 1890. Serial No. 375,707. (No model.)

*To all whom it may concern:*

Be it known that I, JOHN C. TALIAFERRO, a citizen of the United States, residing at Richmond, in the county of Henrico and State of Virginia, have invented certain new and useful Improvements in Dies for Welding Links; and I do declare the following to be a full, clear, and exact description of the invention, such as will enable others skilled in the art to which it appertains to make and use the same.

My invention has relation to improvements in processes and dies for welding links; and it has for its object, among other things, to provide a set of dies of a construction embodying simplicity, durability, and efficiency, capable of so welding a link that if a fin or ridge is formed in the welding process it will be below or above the longitudinal center of the link, whereby when the link is reversed in the dies such ridge or fin is readily driven into the body thereof and a finished link of smooth surface is obtained.

The improvements will be fully understood from the following description and claims, when taken in connection with the accompanying drawings, in which—

Figure 1 is a central vertical sectional view of my improved die-block in an operative position, a link being shown in a position to be welded. Fig. 2 is a perspective view of the lower or base die-block upon which the link rests. Fig. 3 is a perspective view of the upper or pressure die-block, illustrating the die-face to a better advantage.

Referring by letter to the said drawings, A indicates the base die-block, which is preferably of a rectangular form, as illustrated, and may be made in any approved manner. In practice I prefer to form on the base side of the block a dovetail key, (not illustrated,) whereby said block may be readily fixed upon a supporting-bed; but it is obvious that any suitable means might be employed for this purpose.

B indicates a link-receiving socket or recess, which is formed in the block A and has a diagonal bottom B', which extends from a point adjacent to the lower edge of the front side of the block to a point in its top side adjacent to the upper edge of the rear wall, and the upper inner end of this socket B, which is designed to seat the link to be welded, is curved, as better shown in Fig. 2, to conform with the curvature of the end of the link to be welded.

Occupying a position in the longitudinal middle of the socket or seat B and extending from the lower end thereof to a point adjacent to its upper curved end is a saddle or horn C, which is designed and adapted to support and hold the link during the operation of welding the same. This saddle or horn C, which is preferably stepped at a point slightly above its middle, is preferably cast or formed integral with the block A; but, if desirable, it is obvious that the said saddle might be made adjustable in the seat or socket for obvious reasons.

As better illustrated in Fig. 2 of the drawings, the vertical walls of the socket or seat are curved at their junction with the bottom thereof, whereby a seat is afforded conforming with the form of a D-shaped link in cross-section; but it is obvious that the seat afforded between the vertical walls of the socket and the saddle C may have angular corners if links of rectangular form in cross-section are to be operated upon.

That portion of the die-block A forming the side walls of the socket B is provided in its top with a recess, as better shown in Fig. 2, which recess is of a proportional depth, as shown, and extends the full width of the block to afford a seat for the bottom side of the upper die, the said recess having a front vertical wall $a$, a short horizontal bottom $b$, and a rearwardly and upwardly inclined wall $c$, which inclined wall extends to the top of the block at a point opposite the junction of the straight side walls of the socket with the curved end thereof. The upper or pressure die-block D is also preferably of a rectangular form, and may be provided, if desirable, with a dovetail key on its upper side for its attachment to any approved pressure mechanism when pressure is employed to effect the welding. The lower side of this upper die D consists of a forward flat portion $d$, which is designed to rest upon the portion $b$ of the recess in the lower die-block, a rearwardly and upwardly inclined portion $e$, which rests upon the wall $c$ of said recess, and a rear flat portion $f$, which rests upon the upper flat side of the block A, and by this construction it will be seen that the upper die may be firmly and securely seated upon the lower die, and all danger of a casual displacement during operation is obviated; but I do not desire to be understood as confining myself to this precise construction for seating the upper die upon the lower, as any suitable construction adapted to work in conjunction with my improved welding-seats may be employed.

A socket or seat E, similar in form to that of the lower die, but of a greater depth at its upper or inner end, is formed in the upper die, its straight transversely-dished walls extending from the forward edge of the flat portion *f* of the bottom to the front edge of the block, while its curved rear end wall extends slightly to the rear of the front edge of the flat portion *f*, and I here desire to say that I attach importance to the fact that the upper or inner end of the seat E of the upper die is of a greater depth than the upper or inner end of the seat B of the lower die, as by such construction when the link is welded the fin caused by such welding is forced to form below the longitudinal center of said link, as better illustrated in Fig. 1 of the drawings; but it is obvious that if desired the depth of the upper portion of the lower seat B might be greater than the upper portion of the upper seat E, when the fin will be caused to form above the longitudinal center, and it will be seen that in either case by simply reversing the link in the dies after the first welding process and submitting it to pressure the fin will be pressed into the body of the link and a link with a smooth even surface at the welding-point will be produced.

Formed in the middle of the socket or seat E is a socket F, which takes over and forms a socket or seat for the saddle or horn of the lower die-block, and thereby prevents lateral displacement of the upper die-block when in operation.

It is obvious that if desired the inclination of the bottom of the socket B of the lower die may be of a less degree, or even flat, when the lower block may be lengthened to seat the entire link; but I prefer to incline the seat or bottom of the socket about thirty degrees, and to form the same as illustrated and described.

In operation the link, after being brought to the welding heat, is first bent or scarfed in a separate machine, so as to make the ends lap each other, and is then placed in the socket B, in the position shown in Fig. 1, with its lapped ends between the upper curved end of the saddle and the upper end of the socket or seat, when the upper die is adjusted to position and submitted to pressure or blows until the welding is effected, when a ridge or fin will be formed either above or below the longitudinal center of the link by reason of one of the sockets or seats being deeper than the other, and by simply reversing the link in the dies and submitting the same to pressure again the fin will be driven or pressed into the body of the link and a smooth welding will be attained.

Having described my invention, what I claim is—

1. The combination, with a lower or base die provided with an inclined link-seat rounded at its upper end, and a saddle or horn rounded at its upper end and occupying a position in the longitudinal center of said seat, so as to afford a seat for the link between its upper end and the upper end of said socket or seat, of an upper pressure-die provided with a link-seat similar in form to the seat of the lower die, and a socket formed in said seat having a curved upper end and adapted to conform with and receive the saddle of the lower die, the link-seat of one of the dies being of a greater depth at the welding-point than the link-seat of the other die, substantially as and for the purpose specified.

2. The combination, with a lower or base die provided with a link-seat rounded at its upper or inner end and occupying a position in the longitudinal center of said seat, so as to afford a seat for the link between its upper end and the upper or inner end of said socket or seat, of an upper pressure-die provided with a link-seat similar in form to the seat of the lower die, and a socket formed in said seat adapted to conform with and receive the saddle of the lower die, the link-seat of one of the dies being of a greater depth at the welding-point than the link-seat of the other die, substantially as and for the purpose specified.

3. The combination, with a base-die block having a suitable die-seat and provided in its upper side with a recess extending the full width thereof and having a vertical front wall, a flat bottom, and a rearwardly and upwardly inclined rear wall, of an upper pressure-die provided with a die-seat adapted to operate in conjunction with the seat of the lower die and having its lower side formed with a forward flat portion, a rearwardly and upwardly inclined intermediate portion, and a rear flat portion adapted to conform with the recess in the upper side of the base-die block, substantially as and for the purpose described.

In testimony whereof I affix my signature in presence of two witnesses.

JOHN C. TALIAFERRO.

Witnesses:
F. G. WOODSON,
JNO. M. YOUNG.